(12) United States Patent
Snowday, III et al.

(10) Patent No.: US 12,710,508 B2
(45) Date of Patent: Aug. 18, 2026

(54) REAL-TIME LOCATING SYSTEM

(71) Applicant: Midmark RTLS Solutions Inc., Traverse City, MI (US)

(72) Inventors: Hall T. Snowday, III, Traverse City, MI (US); Anthony E. Brown, Traverse City, MI (US); James L. Overbeck, Beulah, MI (US)

(73) Assignee: Midmark RTLS Solutions, Inc., Traverse City, MI (US)

( * ) Notice: Subject to any disclaimer, the term of this patent is extended or adjusted under 35 U.S.C. 154(b) by 332 days.

(21) Appl. No.: 17/826,930

(22) Filed: May 27, 2022

(65) Prior Publication Data

US 2022/0381875 A1 Dec. 1, 2022

Related U.S. Application Data

(60) Provisional application No. 63/195,404, filed on Jun. 1, 2021.

(51) Int. Cl.

| | |
|---|---|
| ***G01S 5/06*** | (2006.01) |
| ***G01S 5/02*** | (2010.01) |
| ***H04W 4/021*** | (2018.01) |
| ***H04W 4/80*** | (2018.01) |

(52) U.S. Cl.

CPC ............ *G01S 5/06* (2013.01); *G01S 5/02521* (2020.05); *H04W 4/021* (2013.01); *H04W 4/80* (2018.02); *G01S 2205/02* (2020.05)

(58) Field of Classification Search

CPC .... G01S 5/06; G01S 5/02521; G01S 2205/02; H04W 4/80; H04W 4/021

USPC .......................................................... 342/465

See application file for complete search history.

(56) References Cited

U.S. PATENT DOCUMENTS

| | | | | |
|---|---|---|---|---|
| 10,251,020 | B1 * | 4/2019 | Swart | G01S 5/0264 |
| 10,360,778 | B1 * | 7/2019 | Lu | G06K 19/0723 |
| 2008/0042844 | A1 | 2/2008 | Christopher | |
| 2008/0278292 | A1 | 11/2008 | Nierenberg et al. | |
| 2009/0216438 | A1 * | 8/2009 | Shafer | G01C 21/206 701/414 |

(Continued)

FOREIGN PATENT DOCUMENTS

| | | | |
|---|---|---|---|
| WO | WO-2012042315 A1 * | 4/2012 | G01S 3/74 |

OTHER PUBLICATIONS

International Search Report and Written Opinion dated Aug. 19, 2022, for International Application No. PCT/US2022/031514, 12 pages.

*Primary Examiner* — Samarina Makhdoom

(74) *Attorney, Agent, or Firm* — FBT Gibbons LLP

(57) ABSTRACT

A real-time locating system of the present disclosure may be used in connection with a particular facility and may include a tag associated with an object disposed within the facility. The tag may be configured to continuously emit radio frequency signals encapsulating a tag identifier and a battery status. The real-time locating system may also include a sensor positioned at a known location within the facility. The sensor may be configured to receive radio frequency signals from the tag and determine an associated signal strength. The real-time locating system may be configured to utilize the known location of the sensor and the signal strength of the radio frequency signal to determine the location of the tag and thus the object within the facility.

24 Claims, 8 Drawing Sheets

(56) References Cited

U.S. PATENT DOCUMENTS

| | | | | |
|---|---|---|---|---|
| 2013/0131973 | A1* | 5/2013 | Friedler | G01S 19/48<br>701/408 |
| 2014/0118113 | A1* | 5/2014 | Kaushik | G01S 5/0231<br>340/8.1 |
| 2015/0186693 | A1 | 7/2015 | Blair et al. | |
| 2016/0295376 | A1* | 10/2016 | Geng | H04W 4/021 |
| 2017/0308727 | A1* | 10/2017 | Lombardi | G06Q 10/08 |
| 2019/0124475 | A1* | 4/2019 | Swart | H04W 4/33 |
| 2019/0354921 | A1* | 11/2019 | Bolta | H04W 4/33 |
| 2020/0200892 | A1* | 6/2020 | Rajab | G01S 13/753 |
| 2020/0265288 | A1* | 8/2020 | Volkerink | H04W 4/029 |

* cited by examiner

REAL-TIME LOCATING SYSTEM

BACKGROUND

Tracking assets and personnel across multiple floors and areas within a building is a difficult, yet desired feature in modern facilities such as within a healthcare environment. However, setup of these systems is time consuming and costly, as each sensor/receiver has to be installed and the location hand coded into the tracking software. If a sensor/receiver is moved or otherwise changed, the location is thereafter incorrect in the tracking software until this hand coding is updated. Further, these systems often rely on their own secure network, which is set up and maintained by the asset tracking vendor. This adds an additional network within the facility that needs serviced and configured and increases the financial and man-power costs of these systems.

Further, current asset tracking systems generate massive amounts of data. This necessitates corresponding large amounts of data storage and bandwidth to facilitate the asset tracking system. The time to set up and manage, plus the amount of storage/bandwidth required, makes companies reluctant to incur the costs associated therewith.

Thus, an improved asset tracking system is needed which features ease of setup and sensors that continuously automatically know where they are positioned, as well as a greatly reduced amount of data transmitted throughout the system.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings, in which like reference numerals identify the same elements and in which:

Figure 1:
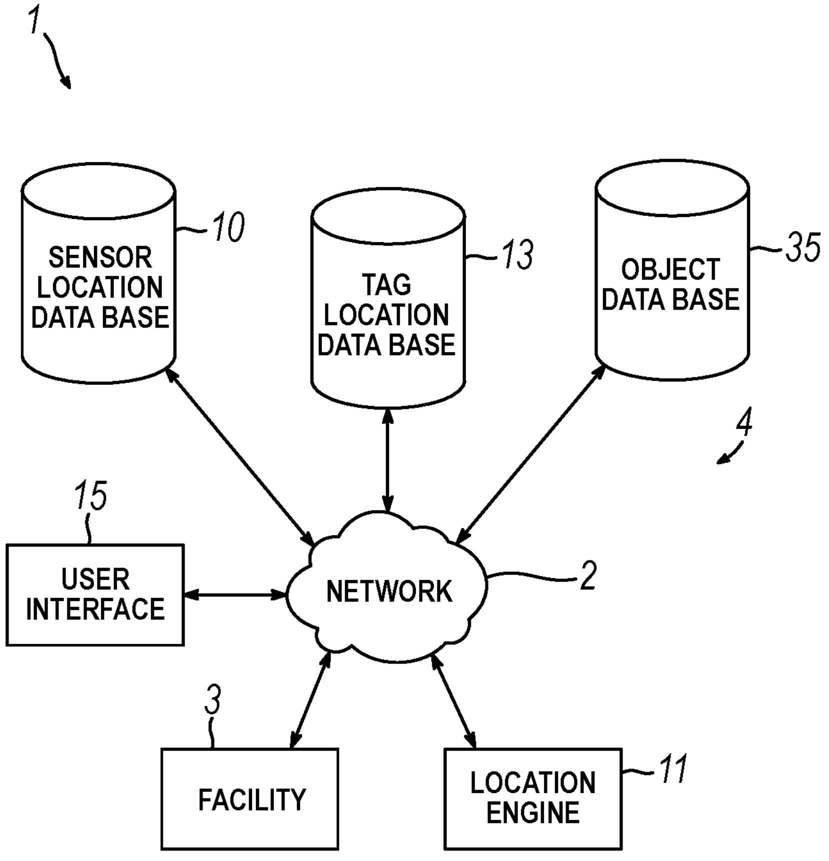
FIG. 1 depicts a diagrammatic view of an exemplary operating environment of an exemplary real-time locating system of the present disclosure.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

It will be appreciated that any one or more of the teachings, expressions, versions, examples, etc. described herein may be combined with any one or more of the other teachings, expressions, versions, examples, etc. that are described herein. The following-described teachings, expressions, versions, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Figure 2:
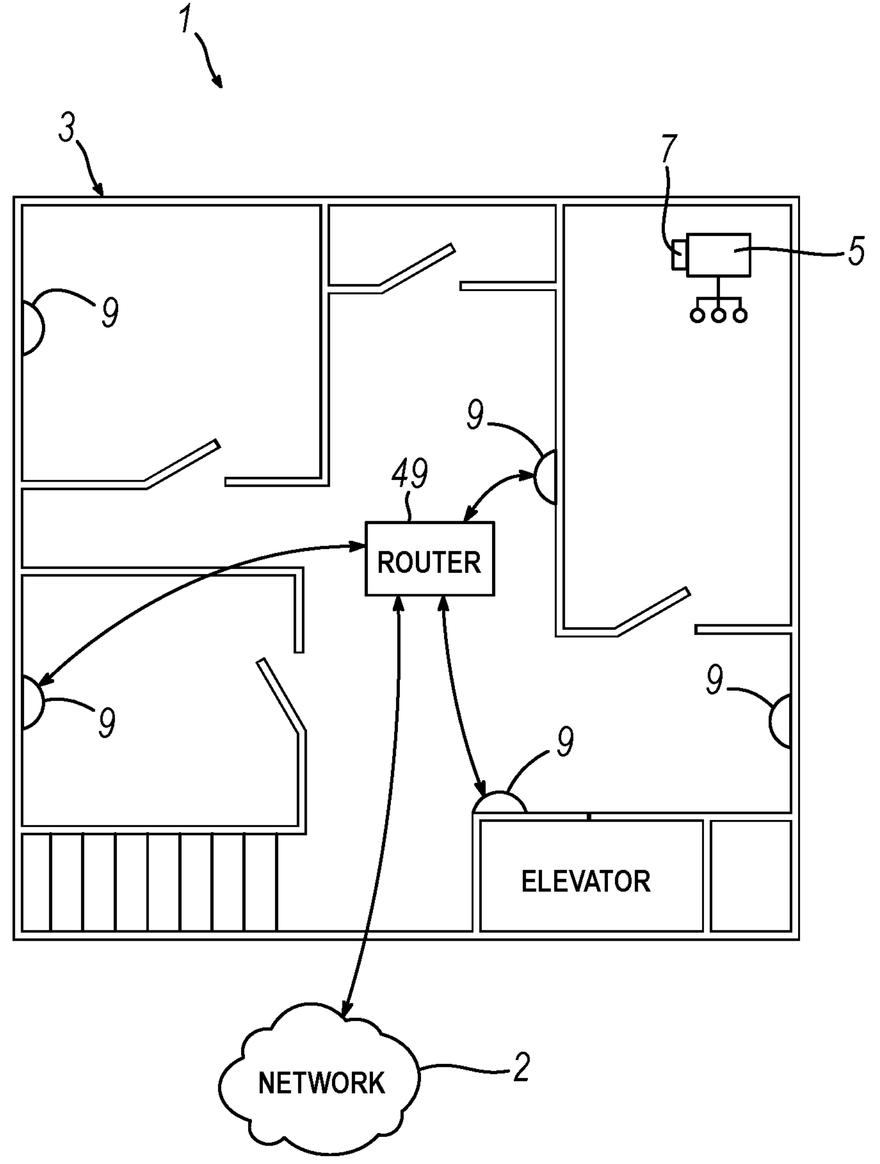
FIG. 2 depicts a diagrammatic view of a portion of an exemplary facility associated with the real-time locating system of FIG. 1.

FIGS. 1 and 2 depict an exemplary embodiment of a real-time locating system (1) along with an operating environment (4) thereof, in accordance with some versions of the present invention. In general, real-time locating system (1) is used in conjunction with a network (2) and a facility (3) for determining the location of an object (5) within or around facility (3). For example, real-time locating system (1) may be used by a healthcare facility to track the location of a medical device, hospital bed, cart, staff, patients, or any other object(s) (5) where real-time tracking or locating may be desired. In general, real-time locating system (1) comprises tags, such as a tag (7), secured to or associated with object (5). This association may be stored in an object database (35) for use within real-time locating system (1). Each tag (7) is used in conjunction with a plurality of sensors (9) disposed at various known areas around facility (3). The location of each sensor (9) may be stored in a sensor location database (10). Each tag (7) emits a radio frequency (RF) signal with identification data incorporated therein and formatted to be received by sensors (9). Rather than infrared (IR), RF signals are utilized in this context due to its superior penetration of various obstacles such as walls and objects. Thus, one feature of real-time locating system (1) is the exclusive utilization of RF signals from tag (7) to sensor (9) and the absence of IR signals.

Real-time locating system (1) further comprises a location engine (11) that utilizes information received from sensors (9) via a stream of data to determine tag location. Sensors (9) receive various RF signals from any nearby tags (7), refine and de-duplicate the data, and thereafter transmit the refined data included in these signals, along with signal strength measurements, to location engine (11) through network (2) via a stream of data. Location engine (11) utilizes signal strength data and the known location of the relevant sensors (9) from sensor location database (10) to determine location information for tags (7). Some versions of location engine (11) may use multilateration, trilateration, or other similar known functions to determine the location of a particular tag (7) given the location of one or more sensors (9) and the signal strength of tag (7) received at each sensor (9). Location engine (11) thereafter stores the derived location of the identified tag (7) in a tag location database (13) connected to network (2). Location engine (11) may be configured to receive the stream of data via one-way communication over a facility network associated with the facility. Thus, given the one-way communication, location engine (11) or portions thereof may exist outside of the facility firewall.

Figure 7:
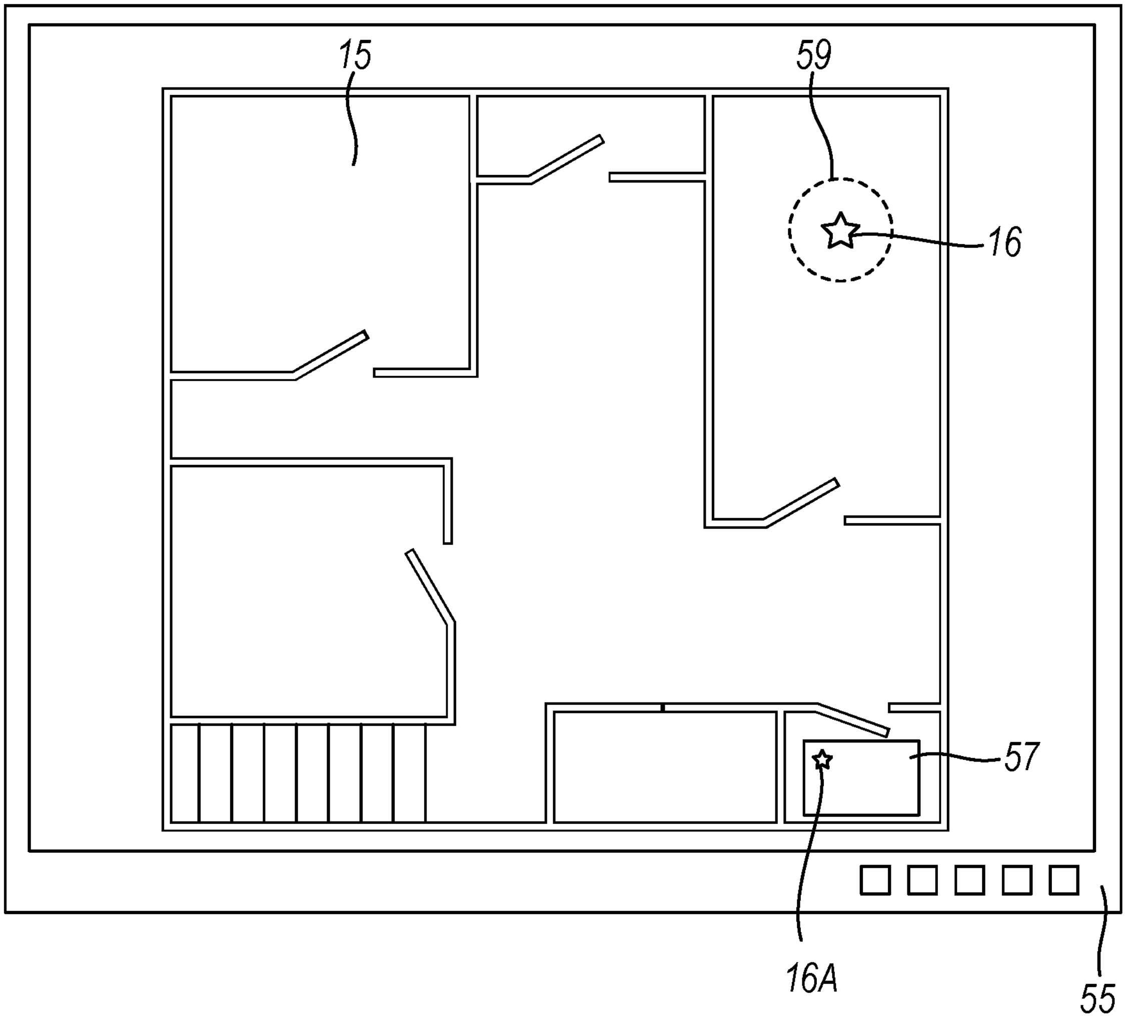
FIG. 7 depicts a diagrammatic view of an exemplary user interface for use in the real-time locating system of FIG. 1.

As shown in FIGS. 1 and 7, a user interface (15) showing a map of facility (3) may be provided with a graphical indicator (16) overlaid on the map to indicate the location of tags (7) and therefore objects (5), with which tags are associated. User interface (15) with graphical indicators (16) for each object (5) graphically depicts to observers where object (5) is located within facility (3). The location of each tag (7), and thus each associated object (5), is retrieved from tag location database (13) and indicated on user interface (15) using graphical indicators (16).

In some versions of operating environment (4), facility (3), location engine (11), user interface (15), sensor location database (10), tag location database (13), and object database (35) may send and receive communications between one another directly. Alternatively, in other versions of operating environment (4), facility (3), location engine (11), user interface (15), sensor location database (10), tag location database (13), and object database (35) may communicate with each other through network (2). Network (2) may include one or more private or public networks (e.g. the Internet) that enable the exchange of data. In some versions of real-time locating system (1), network (2) is a facility network associated with facility (3), such as a public Wi-Fi network provided by facility (3).

While sensor location database (10), tag location database (13), and object database (35) are shown and described as separate databases, one will readily recognize that they may be combined into a single database. Further, any of these databases, or a combined database, may reside on or alongside any other elements of real-time locating system (1), such as location engine (11).

Each of the above noted elements, features, and relationships will be discussed in greater detail below.

I. Mapping of the Facility

Figure 3:
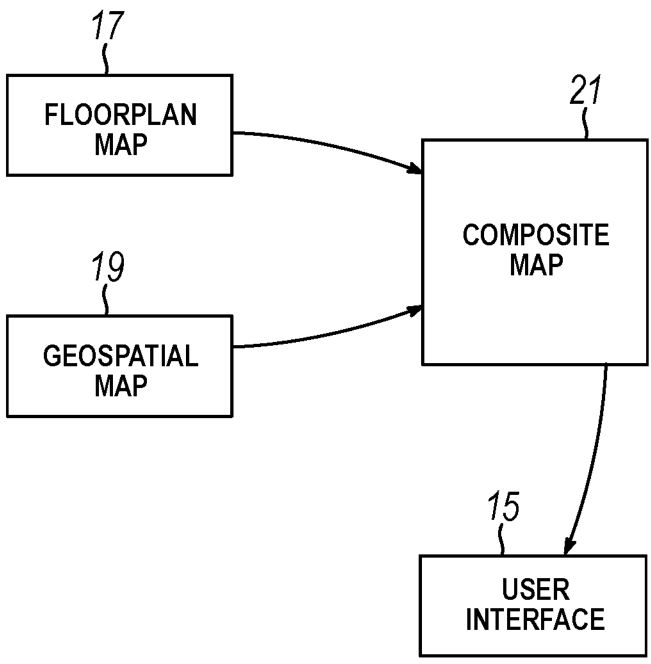
FIG. 3 depicts a diagrammatic view of an exemplary floorplan map, an exemplary geospatial map, and an exemplary composite map for use in the real-time locating system of FIG. 1.

At the outset, one will readily understand that facility (3) may exist in an unlimited number of different layouts and geographical locations. Thus, to begin the initial intake and set up of a particular facility (3) for use with real-time locating system (1), a blueprint, floorplan layout, or similar map of facility (3) is provided, which shows relative locations of different rooms, offices, or other sections or areas of the facility. An exemplary floorplan map (17) is shown in FIG. 3. Floorplan map (17) is thereafter matched, anchored, and/or overlaid with a geospatial map (19), as shown in FIG. 3. Geospatial map (19) may be obtained using global positioning data in combination with satellite, drone, or other existing map resources. Geospatial map (19) includes geographical indicators such as global positioning information and acts to anchor floorplan map (17) to the corresponding real-world environment to facilitate distance calculations and offset distance data for real-time locating system (1). As shown in FIG. 3, the combination of floorplan map (17) and geospatial map (19) results in a composite map (21). Composite map (21) is thereafter used within real-time locating system (1) for tracking locations of sensors (9) and tags (7) as it includes both the layout of facility (3) and the specific geospatial information that allows accurate determination of distances between various rooms, offices, dividing walls, and other features shown on floorplan map (17). In some versions of real-time locating system (1), user interface (15) is generated from or otherwise a function of composite map (21).

II. Tags

Figure 4:
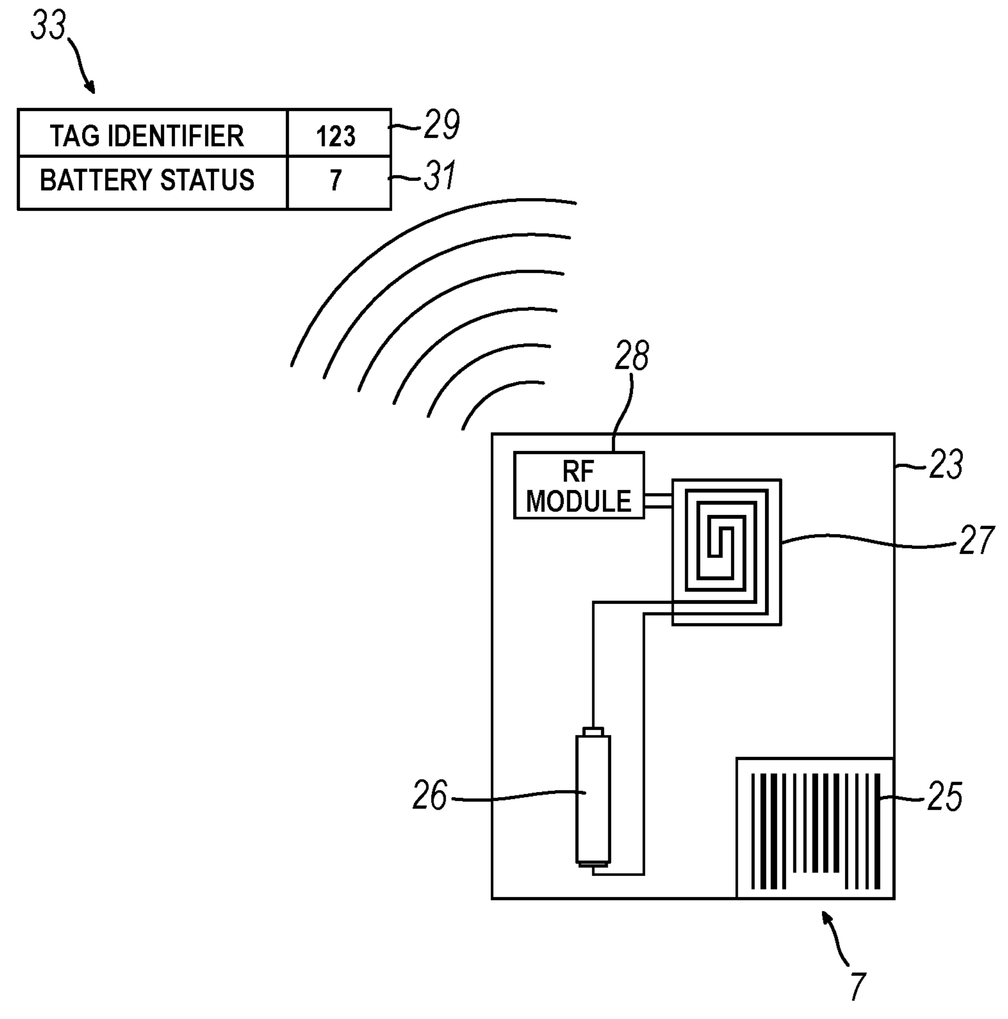
FIG. 4 depicts a diagrammatic view of an exemplary tag for use in the real-time locating system of FIG. 1.

As shown in FIG. 4, tags (7) are generally small, encapsulated beaconing elements having a housing (23), with some versions of tags (7) resembling pucks, dongles, or badges. Housing (23) may be formed of hard plastic or any other similar material. A tag identifier indicia (25) such as a unique serial number, unique bar code, or unique QR code may be disposed on the exterior surface of housing (23) to allow users to inventory and identify individual tags (7). Tag identifier indicia (25) is also used for provisioning of tags (7) into real-time locating system (1), which will be described in greater detail below.

Tags (7) may be attached to objects (5) using straps, adhesives, or any other mechanism for either permanently or temporarily attaching tag (7) to object (5). Tags (7) are battery powered by way of a battery (26) and include a control circuit (27). In some versions of tag (7), control circuit (27) is used to facilitate continuously signaling a tag identifier (29) and a battery status (31) via RF signals to sensors (9). In other versions of tag (7), control circuit (27) is configured to signal tag identifier (29) less frequently or upon some actuation event, such as when tag (7) senses movement or when a user presses a button (not shown) on tag (7). In other versions of tag (7), control circuit (27) is configured to signal tag identifier (29) upon some other event or environmental condition.

An exemplary depiction of the signal generated by control circuit (27) is shown in FIG. 3, with tag identifier (29) and battery status (31) encoded within a RF tag signal (33). Some versions of tag (7) further includes an RF module (28) configured to emit RF tag signal (33) in cooperation with control circuit (27). Other versions of tag (7) include control circuit (27) with an integrated RF module (28) or otherwise incorporated or merged into control circuit (27). While FIG. 3 depicts control circuit (27) signaling tag identifier (29) and battery status (31), other versions of tag (7) may provide additional or different data in the signal generated and sent by tag (7). For example, other versions of control circuit (27) may signal motion state data relating to tag (7). Some examples of motion state data may be when the tag started moving, the momentum, the speed, the general direction, or any other movement related data. Other versions of control circuit (27) may signal whether a physical actuation element such as button (not shown) of tag (7) has been depressed or otherwise actuated. Still other versions of control circuit (27) may signal when a time duration has been met and tag (7) is moving into a "sleep" state.

In some versions, control circuit (27) of tag (7) is configured to continuously generate RF tag signal (33) at a preset periodic interval, thus remaining in regular communication with sensors (9). Inherent in RF tag signal (33), though not explicitly specified or encoded in the signal, is the relative strength of the signal when RF tag signal (33) reaches any particular receiver, such as sensor (9).

In general, electromagnetic waves naturally expand and experience path/propagation loss in free space as the electromagnetic wave expands in a generally increasing sphere shape as it travels from the transmitter to the receiver. Here, signal strength refers to the power density or attenuation of the electromagnetic wave of RF tag signal (33) as it is received at sensor (9). When object (5) and the associated tag (7) change in distance from sensor (9) within facility (3), the signal strength of RF tag signal (33) received at sensor (9) will also naturally change as the signal becomes stronger or weaker, depending on the change in distance. As will be described in more detail below, signal strength data points from sensors (9) may be used to derive a location of tag (7), and thus location of object (5), within facility (3)

As shown in FIG. 4, tag (7) is provisioned into real-time locating system (1) by scanning or otherwise reading tag identifier indica (25) and linking that particular tag (7) with the associated object (5) within real-time locating system (1). An object database (35) may be provided which holds the known or provisioned tags (7) within real-time locating system (1) and correlates tags (7) to objects (5). Tags (7) are provisioned into real-time locating system (1) by adding an entry into object database (35) corresponding to the newly provisioned tag (7). A provisioning application (37) connected to network (2) may be provided for use on a mobile computing device (39) having a scanner (41) to scan or read tag identifier indicia (25). As an alternative to scanning, a user may also type in identification data into provisioning application (37) to input tag (7) data. Once tag (7) is scanned or otherwise entered, provisioning application (37) communicates with object database (35) through network (2) to create an entry in object database (35) corresponding to the scanned tag (7). This provisions tag (7) into real-time locating system (1). The user may also add a text entry and/or picture of object (5) associated with tag (7) to link tag (7) and object (5) within object database (35). In some versions of real-time locating system (1) the user can name tag (7) and/or specify tag identifier (29) through provisioning application (37). In other versions, tag (7) is "dumb" and the name of tag (7) and/or tag identifier (29) is a system generated or hardwired number or code unable to be changed by a user or real-time locating system (1).

Once tag (7) is provisioned, it begins to transmit RF tag signal (33) in accordance with the above description at a set interval. Some versions of tag (7) generally only transmit RF signals and do not act as a receiver to receive RF or other signals from other elements of real-time locating system (1). Other versions of tag (7) may incorporate receiving signals from other elements, such as other tags (7) to provide enhanced telemetry data, such as the distance or signal strength between tags (7). Other versions of tag (7) may provide routing or other networking features for signals of real-time locating system (1). Thus, it is contemplated that tag (7) may incorporate features for enhancing real-time locating system (1), such as those in furtherance of increasing the granularity or reducing latency within real-time locating system (1).

Tags (7) move with object (5) around facility (3) and provide RF tag signal (33) until battery (26) is exhausted. In certain embodiments, tag (7) will also transmit battery status information, which can provide preemptive notice to a user that the battery of a tag (7) will soon require replacement. Once battery (26) is low or exhausted, a technician or user can open housing or otherwise access battery (26) to replace exhausted battery (26) with a fresh battery (26). In other versions of real-time locating system (1), tag (7) having a low or exhausted battery (26) is removed from object database (35), physically disconnected from object (5) and discarded, and a new tag (7) is provisioned and connected to object (5).

III. Sensors

Figure 6:
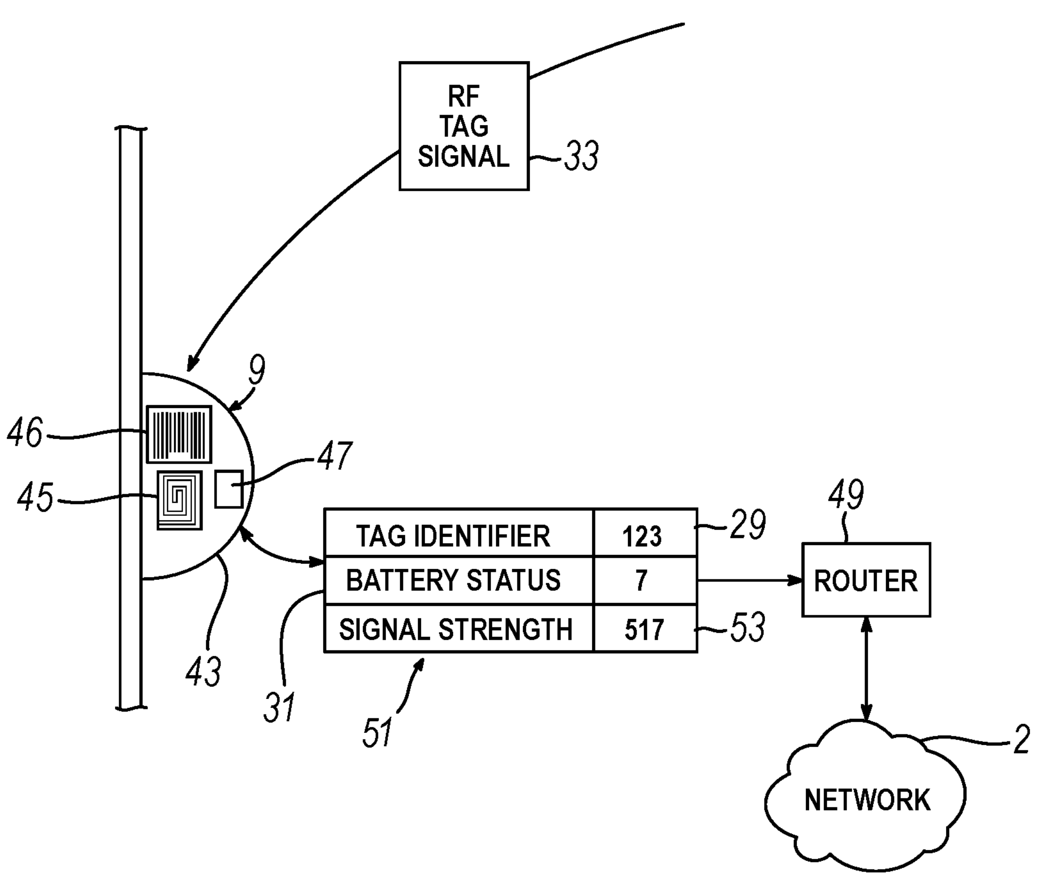
FIG. 6 depicts a diagrammatic view of an exemplary sensor for use in the real-time locating system of FIG. 1.

As described generally above, sensor (9) is configured to constantly receive RF tag signals (33) from any tag (7) within range. As shown in FIG. 6, sensor (9) is generally a small, encapsulated element having a housing (43) as the exterior shell. Inasmuch as it is desired for sensor (9) to be stationary, some versions of sensor (9) are powered by a standard wall outlet and plugged directly into any typical wall socket to receive power. Some versions of sensor (9) further include a mechanism for securing sensor (9) to the wall or the wall outlet (not shown) such as a screw or locking feature. Sensor (9) includes a control circuit (45) used for data transmission and controlling the overall operation of sensor (9). A sensor identifier indicia (46) such as a serial number, bar code, or QR code may be disposed on the exterior surface of housing (43) to allow users to inventory and identify individual sensors (9). Sensor identifier indicia (46) is also used for provisioning of sensors (9) into real-time locating system (1), which will be described in greater detail below.

Sensor (9) further includes a wireless communication module (47) coupled with control circuit (45) and configured to wirelessly transmit data to a router (49) located within facility (3). Router (49) is configured to communicate with network (2) to facilitate communication between sensor (9) and other elements of real-time locating system (1).

Figure 5:
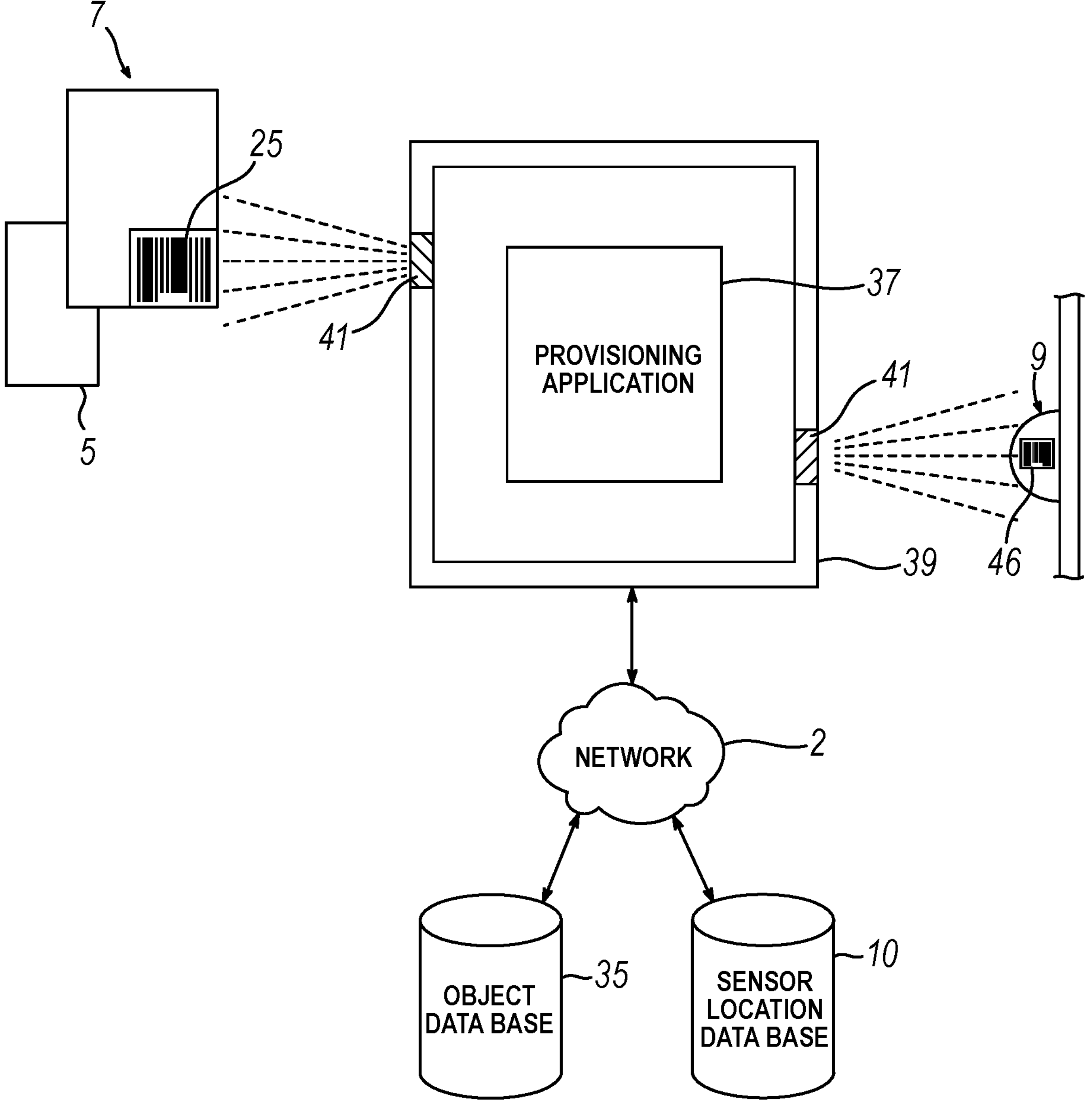
FIG. 5 depicts a diagrammatic view of an exemplary provisioning application for use in the real-time locating system of FIG. 1.

As shown in FIG. 5, a user provisions sensor (9) into real-time locating system (1) by scanning sensor identification indicia (46) such as a unique serial number, unique bar code, or unique QR code disposed on the exterior surface using the previously described mobile computing device (39) and provisioning application (37). Similar to tag (7), as an alternative to scanning, a user may also type in identification data into provisioning application (37) to input sensor (9) data. Once sensor (9) is scanned or otherwise entered, provisioning application (37) provides a version of composite map (21) of facility (3) to the user and the user indicates on the map where sensor (9) is located within facility (3). In some versions of real-time locating system (1) the user can name sensor (9) through provisioning application (37). In other versions, sensor (9) the name of sensor (9) is a system generated or hardwired number or code unable to be changed by a user or real-time locating system (1).

Sensor (9) information is passed over network (2) and stored in sensor location database (10) to track the location of sensor (9) as this information is used in determining the location sensors (9) relative to one another, and, thus, allows determination of location of tags (7). This provisions sensor (9) into real-time locating system (1). Provisioning application (37) thereafter communicates with sensor (9) over Bluetooth to provide Wi-Fi login credentials or otherwise authenticate sensor (9) with respect to router (49) and the overall wireless signal or Internet provided within facility (3). This allows sensor (9) to communicate over the internal wireless communications signal, through router (49), over network (2), and ultimately communicate with location engine (11) to provide information relating to tags (7) and signal strengths of RF tag signals (33).

Once provisioned, sensors (9) constantly receive RF tag signals (33) from any tag (7) within range at varying and potentially dynamically changing signal strengths. Sensors (9) measure the signal strength of any given incoming RF tag signal (33) and encapsulate this information, along with the RF tag signal (33) information, into a sensor signal (51). Sensor signals (51) are thereafter passed on to location engine (11) for calculating the location of tag (7). As shown in FIG. 6, for any given incoming RF tag signal (33), sensor (9) determines a signal strength (53) and thereafter provides tag identifier (29), battery status (31), and signal strength (53) in the form of sensor signal (51) to location engine (11).

Beyond the provisioning steps and the underlying TCP/IP handshake procedures, this data communication route can be thought of as a one-way route from tag (7) to sensor (9) to location engine (11). Thus, given the general one-way communication between these elements within real-time locating system (1), sensors (9) do not need to be positioned behind the firewall of facility (3) and can be placed onto the guest or visitor network. This reduces the time and complexity involved with installing and maintaining real-time locating system (1) within facility (3).

IV. Location Engine

In general, location engine (11) receives data from sensors (9) and uses the data to determine the location of tags (7) within facility (3), which inherently determines the location of objects (5) within facility (3) to which tags (7) are attached. Location engine (11) thereafter provides the location data to tag location database (13), constantly updating the location of tags (7) within tag location database (13) as new tag (7) information is received.

More specifically, location engine (11) utilizes the differing signal strengths of a particular tag (7) received at different sensors (9) to determine the location of the particular tag (7). Given that the location of each sensor (9) is known, generally stationary, and stored/accessible via sensor location database (10), once location engine (11) receives signal strength data from sensors (9) for the same tag (7), a location can be calculated and derived using multilateration, trilateration, or other similar techniques.

As tag (7) moves around facility (3), tag (7) emits RF tag signal (33) and each sensor (9) receiving the signal measures signal strength, providing this information as signal strength (53) within sensor signal (51) to location engine (11). Location engine (11) determines location for each tag (7) in real-time locating system (1) and provides this information to tag location database (13). Inasmuch as tags (7) emit RF tag signal (33) continuously, this location information is continuously updated by location engine (11) and the location of the associated object (5) can be seen in essentially real-time with minimal latency.

V. User Interface

As shown in FIG. 7, user interface (15) may be provided on or projected through a computing system (55) such as a laptop computer. Some versions of user interface (15) depict an overhead map of facility (3) with graphical indicators (16) overlaid on the map to indicate the location of objects (5). Thus, user interface (15) graphically depicts to observers where object (5) is located within facility (3). In order to provide and update this information, the location of each tag (7), and thus each associated object (5), is continuously retrieved from tag location database (13) and correlated to user interface (15) to position the corresponding graphical indicator (16) onto the map in the proper position. Thus, a user can interact or observe user interface (15) to determine where object (5) is currently located within facility (3).

A legend, menu, or other information display (57) may be provided to the observer for use in reading or interacting with user interface (15). In some versions of user interface (15), information display (57) comprises a description of each object (5) in conjunction with the corresponding smaller version of graphical indicator (16) for that object (5), shown in FIG. 7 as graphical indicator (16A). This allows a user to quickly determine which graphical indicator (16) correlates to which real world object (5). For example, when object (5) represents a mobile crash cart, information display (57) may provide the words "Crash Cart" next to a small version of a stylized crash cart as graphical indicator (16A). This same stylized crash cart may also be used as graphical indicator (16) on the map portion of user interface (15) to depict where the mobile crash cart is located within facility (3). Various features such as clicking on the legend version of graphical indicator (16A) to highlight the location of graphical indicator (16) in the map are contemplated and within the scope of the disclosure.

A confidence bubble (59) may be provided as an encirclement diagram or other graphical indication around graphical indicator (16) on user interface (15). Confidence bubble (59) depicts a generalized location of where real-time locating system (1) believes the particular tag (7) resides within underlying physical environment. Confidence bubble (59) indicates to the user the range of area to search and provides an understanding to the user that the location of graphical indicator (16) is where real-time location system (1) believes tag (7) is located as a "most confident" placement, but tag (7) could still be offset somewhat from this area in practice.

VI. Radio Frequency Communication Protocols

The different elements of real-time locating system (1) can communicate using a number of various radio frequency communication protocols. By way of example, in one preferred embodiment, tags (7) communicate with sensors (9) using standard Bluetooth Low Energy ("BLE") communication protocols. Similarly, provisioning of tags (7) and sensors (9) by the provisioning app and associated mobile device or laptop computer can occur over BLE. Once a sensor is provisioned and its location recorded in sensor location database, sensors (9) can receive communications from tags (7) via BLE and then subsequently relay sensor signal to real-time locating system (1) using standard 802.11 communication protocols.

The BLE protocol includes an "advertising signal" which is used to broadcast information without ever connecting to another device, such as a beacon transmitting data in one direction only. In most situations, this advertising signal is used to solicit and begin the establishment of a bi-directional connection between two devices. However, in some versions of real-time location system (1), tags (7) are configured with BLE protocol and hardware, and sensors (9) listen for advertising signals from tags (7) via the BLE protocol. A link or bi-directional communication is not needed, nor established, in this version of real-time locating system (1), such that the communication from tag (7) to sensor (9) is uni-directional. This builds efficiency into the overall system, as no response is provided to tags (7) from sensors (9) upon receiving a signal. Further, inasmuch as BLE has 40 channels within the 2.4 GHz band, each band is separated by 2 MHz and 3 of these 40 channels are dedicated to advertising signals. Thus, sensors (9) may be configured with a bandpass filter to filter out any signals outside of the BLE advertising signals, even within the 2.4 GHz band, to fine tune the sensor (9) and reduce unwanted signal reception and needless data gathering. This adds additional efficiencies into real-time locating system (1) to allow for high speed and low volume of data collection.

Some versions of real-time locating system (1) include a de-duplication feature, whereby sensor (9) is configured to filter out a subsequent RF tag signal (33) with functionally identical information to the previously received RF tag signal (33). Thus, if a particular tag (7) is residing in a set space and sending successive RF tag signals (33) with the same signal strength and associated data, real-time locating system (1) may be configured to "drop" this functionally identical data and not pass it along to location engine (11) as the entry in the database would be redundant and increase data storage and bandwidth to the network. For example, if a first tag signal and a second tag signal are received in succession at sensor (9) from the same tag (7), sensor (9) is configured to determine whether the first tag signal and the second tag signal are functionally identical. Upon determining the first tag signal and the second tag signal are functionally identical, sensor (9) is configured to refrain from transmitting tag identifier (29), battery status (31), and signal strength (53) of the second tag signal to location engine (11). In this context, "functionally identical" is understood to mean substantially similar within a given threshold of signal information. For example, if battery status (3/1) of the second tag signal is a fraction of a percent lower than battery status (31) of the first tag signal, some versions of real-time location system (1) would consider this as satisfying the "functionally identical" comparison and would thus refrain from passing along the second tag signal.

VII. Exemplary Method

Figure 8:
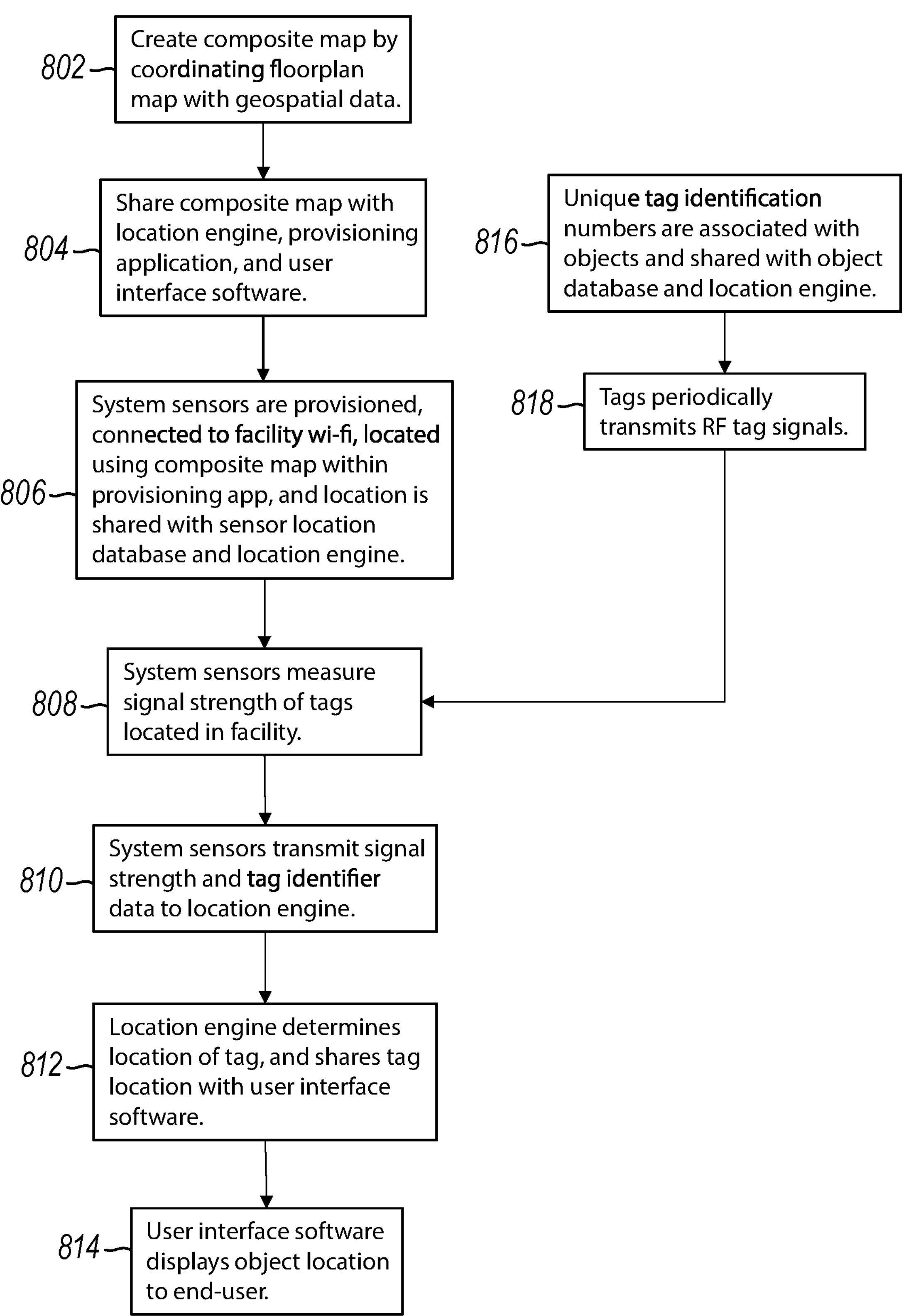
FIG. 8 depicts a flowchart of an exemplary method used by or within real-time locating system of FIG. 1.

FIG. 8 provides an overall flowchart for one preferred embodiment of the present invention. The flowchart begins at step 802, where a composite map (21) is created by coordinating a floorplan map, blueprints, or other facility layout drawings with geospatial map data. As described above, this allows accurate distance data and measurements of the floorplan to be efficiently obtained, and also allows efficient deployment of sensors (9) into facility (3) during set up of real-time locating system (1) at facility (3).

In step 804 the composite map (21) is then shared with the location engine (11), provisioning application (37) and user interface (15) software. Once the composite map (21) is shared with the provisioning application (37), a user can use the composite map (21) within the provisioning application to record the placement of sensors (9) within facility (3) and share this sensor location information with sensor location database and with location engine (step 806). As described above, the provisioning application (37) can also be used to initialize sensors (9) and communicate with the sensors (9) to provide them with network access credentials to access the local wi-fi network in the facility and subsequently connect to various other elements of the real-time locating system (1), such as the location engine (11). Once sensor locations are recorded and sensors (9) are operational, the sensors begin measuring received signal strength of any tags (7) within range of the sensors (9) and transmitting signal strength information and other RF tag signal (33) data to location engine (11) (steps 808, 810).

At any time during or after the above-outlined steps of FIG. 8, a user can introduce new tags (7) into the real-time locating system (1) by using the provisioning app or user interface (15) software to activate a tag (7) and, cause the tag (7) to begin periodically transmitting RF tag signals (33), and share its unique tag identifier (29) with other elements of real-time locating system (1) such as tag location database (13), location engine (11), and object database (35) (steps 816, 818).

In step 812 the location engine uses known sensor (9) location data (derived from composite map (21)) in combination with signal strength data to determine tag (7) location and share tag (7) location with user interface (15) software. User interface (15) software can then use tag (7) location information from location engine (11) and object information from object database (35) to provide real-time object location information to an end-user by way of the user interface (15) (step 814).

VIII. Exemplary Combinations

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

A real-time locating system comprising: (a) a composite map comprising a geospatial map of a facility combined with a floorplan map of the facility; (b) a tag disposed in the facility, wherein the tag is configured to emit a tag signal encoding a tag identifier and battery status of a battery associated with the tag; (c) a sensor disposed at a stationary position within the facility, wherein the sensor is configured to receive the tag signal and measure a signal strength of the tag signal upon receipt, wherein the sensor is configured to transmit the tag identifier, the battery status, and the signal strength of the tag signal as a stream of data; (d) a provisioning application, wherein the provisioning application is configured to display at least a portion of the composite map, wherein the provisioning application is configured to accept a user input indicating the sensor location on the composite map; (e) a location engine, wherein the location engine is configured to receive the stream of data and derive a location of the tag in the composite map based at least in part on the stream of data; and (f) a user interface, wherein the user interface displays at least a portion of the composite map with a graphical indicator at the location to inform the user of the location of the tag in the facility.

Example 2

The real-time locating system of the subsequent or any of the following Examples, wherein the tag signal is transmitted at a range, wherein the sensor includes a bandpass filter, wherein the bandpass filter rejects frequencies outside of the range of the tag signal.

Example 3

The real-time locating system of any of the subsequent or following Examples, wherein the tag signal is a first tag signal, wherein the sensor is configured to: (a) receive a second tag signal; (b) determine if the first tag signal and the second tag signal are functionally identical; and (c) upon determining the first tag signal and the second tag signal are functionally identical, refrain from transmitting the tag identifier, the battery status, and the signal strength of the second tag signal as the stream of data.

Example 4

The real-time locating system of any of the subsequent or following Examples, wherein the tag signal is a first tag signal, wherein the sensor is configured to: (a) receive a second tag signal and measure a signal strength of the second tag signal upon receipt; (b) determine if the signal strength of the first tag signal and the signal strength of the second tag signal are functionally identical; and (c) upon determining the signal strength of the first tag signal and the signal strength of the second tag signal are functionally identical, refrain from transmitting the tag identifier, the battery status, and the signal strength of the second tag signal as the stream of data.

Example 5

The real-time locating system of any of the subsequent or following Examples, wherein the location engine derives the location via trilateration.

Example 6

The real-time locating system of any of the subsequent or following Examples, wherein the tag signal is a uni-directional beacon signal.

Example 7

The real-time locating system of any of the subsequent or following Examples, wherein the tag signal is a Bluetooth Low Energy advertising signal.

Example 8

The real-time locating system of any of the subsequent or following Examples, wherein the provisioning application is configured to prompt the user to scan a sensor identifier indicia on the sensor prior to accepting the user input indicating the location of the sensor on the composite map.

Example 9

The real-time locating system of any of the subsequent or following Examples, wherein the provisioning application is configured to prompt the user to scan a sensor identifier indicia on the sensor prior to accepting the user input indicating the sensor location on the composite map.

Example 10

The real-time locating system of any of the subsequent or following Examples, wherein the facility is associated with a facility network, wherein the sensor is configured to wirelessly transmit the stream of data to the location engine over the facility network.

Example 11

The real-time locating system of any of the subsequent or following Examples, wherein the sensor is configured to wirelessly transmit the stream of data to the location engine over the facility network via a one-way communication.

Example 12

The real-time locating system of any of the subsequent or following Examples, wherein the wherein the user interface displays a confidence bubble around the location to inform the user of a generalized location of the tag in the facility.

Example 13

The real-time locating system of any of the subsequent or following Examples, wherein the location engine is configured to store the derived location in a location database, wherein the user interface is configured to retrieve the location from the location database prior to displaying the graphical indicator at the location on the composite map.

Example 14

A real-time locating system comprising: (a) a location engine, wherein the location engine is configured to receive a stream of data via one-way communication over a facility network associated with the facility and provide a location within a facility based on the stream of data; (b) a tag configured to emit a tag signal encoding a tag identifier and battery status, wherein the tag is disposed in a facility; (c) at plurality of sensors disposed at stationary positions within the facility, wherein the plurality of sensors are configured to each individually receive the tag signal and measure a signal strength of the tag signal upon receipt, wherein the plurality of sensors are configured to each individually transmit the tag identifier, the battery status, and the signal strength of the tag signal to the location engine as the stream of data; and (d) a graphical display, wherein the graphical display depicts at least a portion of the facility, wherein the object is depicted at the location on the graphical display.

Example 15

The real-time locating system of any of the subsequent or following Examples, wherein the tag transmits the tag signal to the plurality of sensors via one-way Bluetooth Low Energy communication.

Example 16

The real-time locating system of any of the subsequent or following Examples, wherein the tag signal is transmitted at a range, wherein each sensor in the plurality of sensors includes a bandpass filter, wherein the bandpass filter rejects frequencies outside of the range of the tag signal.

Example 17

The real-time locating system of any of the subsequent or following Examples, wherein the tag signal is a first tag signal, wherein each sensor in the plurality of sensors is configured to: (a) receive a second tag signal; (b) determine if the first tag signal and the second tag signal are functionally identical; and (c) upon determining the first tag signal and the second tag signal are functionally identical, refrain from transmitting the tag identifier, the battery status, and the signal strength of the second tag signal as the stream of data.

Example 18

The real-time locating system of any of the subsequent or following Examples, wherein the tag signal is a first tag signal, wherein each sensor in the plurality of sensors is configured to: (a) receive a second tag signal and measure a signal strength of the second tag signal upon receipt; (b) determine if the signal strength of the first tag signal and the signal strength of the second tag signal are functionally identical; and (c) upon determining the signal strength of the first tag signal and the signal strength of the second tag signal are functionally identical, refrain from transmitting the tag identifier, the battery status, and the signal strength of the second tag signal as the stream of data.

Example 19

A method comprising: (a) combining a floorplan map of a facility and a geospatial map related to the facility into a composite map, wherein the composite map includes geospatial data; (b) providing the composite map to a user via a provisioning application; (c) selecting, by the user, a selected area of the composite map, wherein the selected area indicates relative placement of a sensor within the facility; (d) retrieving a geospatial reference point associated with the selected area from the composite map; and (e) associating the geospatial reference point with the sensor in a sensor location database.

Example 20

The real-time locating system or method of any of the subsequent Examples, further comprising: prior to providing the composite map to the user via the provisioning application, prompting the user to input a sensor identifier indicia.

VIII. Miscellaneous

It should be understood that any of the examples described herein may include various other features in addition to or in lieu of those described above. By way of example only, any of the examples described herein may also include one or more of the various features disclosed in any of the various references that are incorporated by reference herein.

It should be understood that any one or more of the teachings, expressions, embodiments, examples, etc. described herein may be combined with any one or more of the other teachings, expressions, embodiments, examples, etc. that are described herein. The above-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Having shown and described various versions of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, versions, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

We claim:

1. A real-time locating system comprising:

(a) a composite map comprising a geospatial map of a facility and its surrounding environment having geographical indicators with global positioning information combined with a floorplan map of the facility, wherein the floorplan map is anchored to the geographical indicators of the geospatial map to align the floorplan map to real-world coordinates and form the composite map;

(b) a tag disposed in the facility, wherein the tag is configured to emit a tag signal encoding a tag identifier and battery status of the battery associated with the tag;

(c) a sensor disposed at a stationary position within the facility, wherein the sensor is configured to receive the tag signal and measure a signal strength of the tag signal upon receipt, wherein the sensor is configured to transmit the tag identifier, the battery status, and the signal strength of the tag signal as a stream of data;

(d) a provisioning application, wherein the provisioning application is configured to display at least a portion of the composite map, wherein the provisioning application is configured to accept a user input indicating a sensor location on the composite map;

(e) a location engine, wherein the location engine is configured to receive the stream of data and derive a location of the tag in the composite map based at least in part on the stream of data; and (f) a user interface, wherein the user interface displays at least a portion of the composite map with a graphical indicator at the location to inform the user of the location of the tag in the facility, wherein the graphical indicator includes a confidence bubble configured to indicate to the user a real-time range of area of the location of the tag in the facility, wherein the confidence bubble is presented to the user on the composite map.

2. The real-time locating system of claim 1, wherein the tag signal is transmitted at a range, wherein the sensor includes a bandpass filter, wherein the bandpass filter rejects frequencies outside of the range of the tag signal.

3. The real-time locating system of claim 1, wherein the tag signal is a first tag signal, wherein the sensor is configured to:

(a) receive a second tag signal;

(b) determine if the first tag signal and the second tag signal are functionally identical; and (c) upon determining the first tag signal and the second tag signal are functionally identical, refrain from transmitting the tag identifier, the battery status, and the signal strength of the second tag signal as the stream of data.

4. The real-time locating system of claim 1, wherein the tag signal is a first tag signal, wherein the sensor is configured to:

(a) receive a second tag signal and measure a signal strength of the second tag signal upon receipt;

(b) determine if the signal strength of the first tag signal and the signal strength of the second tag signal are functionally identical; and (c) upon determining the signal strength of the first tag signal and the signal strength of the second tag signal are functionally identical, refrain from transmitting the tag identifier, the battery status, and the signal strength of the second tag signal as the stream of data.

5. The real-time locating system of claim 1, wherein the location engine derives the location via trilateration.

6. The real-time locating system of claim 1, wherein the tag signal is a uni-directional beacon signal.

7. The real-time locating system of claim 6, wherein the tag signal is a Bluetooth Low Energy advertising signal.

8. The real-time locating system of claim 1, wherein the provisioning application is configured to prompt the user to scan a sensor identifier indicia on the sensor prior to accepting the user input indicating the location of the sensor on the composite map.

9. The real-time locating system of claim 1, wherein the facility is associated with a facility network, wherein the sensor is configured to wirelessly transmit the stream of data to the location engine over the facility network.

10. The real-time locating system of claim 9, wherein the sensor is configured to wirelessly transmit the stream of data to the location engine over the facility network via a one-way communication.

11. The real-time location system of claim 1, wherein the user interface displays the confidence bubble around the location to inform the user of a generalized location of the tag in the facility, wherein the graphical indicator depicts a mobile crash cart.

12. The real-time location system of claim 1, wherein the location engine is configured to store the derived location in a location database, wherein the user interface is configured to retrieve the location from the location database prior to displaying the graphical indicator at the location on the composite map.

13. A real-time locating system comprising:

(a) a location engine, wherein the location engine is configured to receive a stream of data via one-way communication over a facility network associated with a facility and provide a location within the facility based on the stream of data, wherein the location engine uses a composite map comprising a geospatial map of the facility and at least a portion of an exterior outdoor area in which it is located anchored to a floorplan map of the facility, the composite map including both a set of indoor layout information from the floorplan map and a set of geographical indicators with global positioning information from the geospatial map;

(b) a tag configured to emit a tag signal encoding a tag identifier and battery status, wherein the tag is disposed in a facility;

(c) a plurality of sensors disposed at stationary positions within the facility, wherein the plurality of sensors are configured to each individually receive the tag signal and measure a signal strength of the tag signal upon receipt, wherein the plurality of sensors are configured to each individually transmit the tag identifier, the battery status, and the signal strength of the tag signal to the location engine as the stream of data to thereby determine a location of the tag within the facility based on the collective streams of data from each sensor of the plurality of sensors; and (d) a graphical display, wherein the graphical display depicts at least a portion of the facility, wherein an object is depicted at the location on the graphical display along with a depiction of a confidence bubble around the object on the graphical display, wherein the confidence bubble is configured to depict a generalized location of the object, and wherein the location is determined at least in part by using the set of indoor layout information and the set of geographical indicators provided by the composite map.

14. The real-time locating system of claim 13, wherein the tag transmits the tag signal to the plurality of sensors via one-way Bluetooth Low Energy communication.

15. The real-time locating system of claim 13, wherein the tag signal is transmitted at a range, wherein each sensor in the plurality of sensors includes a bandpass filter, wherein the bandpass filter rejects frequencies outside of the range of the tag signal.

16. The real-time locating system of claim 13, wherein the tag signal is a first tag signal, wherein each sensor in the plurality of sensors is configured to:

(a) receive a second tag signal;

(b) determine if the first tag signal and the second tag signal are functionally identical; and (c) upon determining the first tag signal and the second tag signal are functionally identical, refrain from transmitting the tag identifier, the battery status, and the signal strength of the second tag signal as the stream of data.

17. The real-time locating system of claim 13, wherein the tag signal is a first tag signal, wherein each sensor in the plurality of sensors is configured to:

(a) receive a second tag signal and measure a signal strength of the second tag signal upon receipt;

(b) determine if the signal strength of the first tag signal and the signal strength of the second tag signal are functionally identical; and (c) upon determining the signal strength of the first tag signal and the signal strength of the second tag signal are functionally identical, refrain from transmitting the tag identifier, the battery status, and the signal strength of the second tag signal as the stream of data.

18. A method comprising:

(a) combining a floorplan map of a facility and a geospatial map related to the facility and its exterior environment into a composite map, wherein the composite map includes geospatial data;

(b) providing the composite map to a user via a provisioning application;

(c) selecting, by the user, a first selected area of the composite map, wherein the first selected area indicates relative placement of a first sensor within the facility;

(d) retrieving a first geospatial reference point associated with the first selected area from the composite map;

(e) associating the first geospatial reference point with the first sensor in a sensor location database;

(f) repeating steps (c) through (e) for a second selected area, a second sensor, and a second geospatial reference point; and (g) using distance determinations of a tag from each of the first sensor and the second sensor to store a third geospatial reference point into the sensor location database, wherein the third geospatial reference point represents a location of the tag within the facility, wherein the geospatial reference point includes an illustrated confidence error of a generalized location of the tag within the facility.

19. The method of claim 18, further comprising:

(a) prior to providing the composite map to the user via the provisioning application, prompting the user to input a sensor identifier indicia.

20. A method of deploying and operating a real-time locating system within a facility, the method comprising:

(a) creating a composite map by combining a floorplan map of the facility with a geospatial map having geographical indicators with global positioning information, wherein the floorplan map is anchored to the geographical indicators of the geospatial map to align the floorplan map to real-world coordinates and form the composite map;

(b) scanning, via a provisioning application executing on a mobile computing device, a sensor identifier indicia disposed on an exterior surface of a housing of a sensor;

(c) displaying, via the provisioning application, at least a portion of the composite map and receiving a user input indicating a location of the sensor on the composite map, wherein the location corresponds to a physical location of the sensor within the facility;

(d) storing the location of the sensor in a sensor location database;

(e) communicating, from the provisioning application to the sensor over Bluetooth, network access credentials for authenticating the sensor with a facility network associated with the facility, thereby enabling the sensor to wirelessly communicate through a router over the facility network;

(f) receiving, at the sensor from a tag disposed in the facility, a first radio frequency tag signal encoding at least a tag identifier and a battery status of a battery associated with the tag;

(g) measuring, at the sensor, a signal strength of the first radio frequency tag signal;

(h) receiving, at the sensor from the tag, a second radio frequency tag signal, and determining at the sensor whether the first radio frequency tag signal and the second radio frequency tag signal are functionally identical, wherein functionally identical is determined based on whether the first radio frequency tag signal and the second radio frequency tag signal are within a given threshold of signal strength;

(i) upon determining the first radio frequency tag signal and the second radio frequency tag signal are functionally identical, refraining from transmitting data of the second radio frequency tag signal to a location engine;

(j) upon determining the first radio frequency tag signal and the second radio frequency tag signal are not functionally identical, transmitting from the sensor to the location engine via one-way communication over the facility network, the tag identifier, the battery status, and the signal strength of the second radio frequency tag signal;

(k) deriving, at the location engine, a location of the tag within the composite map based at least in part on the signal strength and the location of the sensor from the sensor location database; and (l) displaying, on a user interface, at least a portion of the composite map with a graphical indicator at the derived location of the tag and an encirclement diagram around the graphical indicator indicating a generalized range of area of the location of the tag within the facility.

21. The method of claim 20, wherein the one-way communication from the sensor to the location engine enables the sensor to operate on a guest network of the facility outside of a firewall of the facility.

22. The method of claim 20, wherein the first radio frequency tag signal and the second radio frequency tag signal are Bluetooth Low Energy advertising signals transmitted uni-directionally from the tag to the sensor, and wherein the sensor includes a bandpass filter configured to filter out signals outside of Bluetooth Low Energy advertising channels within a 2.4 GHz band.

23. The method of claim 20, wherein the sensor is powered by a standard wall outlet and plugged directly into a wall socket.

24. The method of claim 23, wherein the sensor further includes a mechanism for securing the sensor to the wall or the wall outlet.

* * * * *